United States Patent [19]

Woldy et al.

[11] Patent Number: 4,590,326
[45] Date of Patent: May 20, 1986

[54] MULTI-ELEMENT THERMOCOUPLE

[75] Inventors: Paul N. Woldy, Houston, Tex.; John S. Stevenson, Los Angeles, Calif.; William E. Preston, Houston, Tex.

[73] Assignee: Texaco Inc., White Plains, N.Y.

[21] Appl. No.: 620,664

[22] Filed: Jun. 14, 1984

[51] Int. Cl.⁴ .............................................. H01L 35/02
[52] U.S. Cl. ..................................... 136/233; 136/231
[58] Field of Search .............................. 136/230–233, 136/216, 217, 218; 374/144, 179

[56] References Cited

U.S. PATENT DOCUMENTS

| | | | |
|---|---|---|---|
| 3,317,353 | 5/1967 | Bingham | 136/233 |
| 3,845,706 | 11/1974 | Strimple et al. | 136/230 |
| 3,923,552 | 12/1975 | Parris | 136/234 |
| 3,966,500 | 6/1976 | Brixy | 136/233 |
| 4,018,624 | 4/1977 | Rizzolo | 136/233 |
| 4,075,036 | 2/1978 | Lysikov et al. | 136/233 |
| 4,467,134 | 8/1984 | Pustell | 136/230 |

FOREIGN PATENT DOCUMENTS

| | | | |
|---|---|---|---|
| 354813 | 7/1961 | Switzerland | 136/233 |
| 1252754 | 11/1971 | United Kingdom | 136/233 |

*Primary Examiner*—Thomas Wallen
*Attorney, Agent, or Firm*—Robert A. Kulason; James J. O'Loughlin

[57] ABSTRACT

In a means for supporting an elongated heavy thermocouple assembly the weight of the assembly is carried by a rigid support at an intermediate point along its length instead of by a long lever arm exerting a substantial torque at the point of attachment to the reactor vessel shell as in the conventional design.

8 Claims, 4 Drawing Figures

MULTI-ELEMENT THERMOCOUPLE

BACKGROUND OF THE INVENTION

This invention relates generally to instruments for the measurement of elevated temperatures in gas filled chambers and specifically for the measurement of the elevated temperatures of combustion chambers such as in the gasification of coal in a partial oxidation process carried out within a reactor vessel shell that is lined internally with successive courses of refractory materials.

In this process it is well known that high temperatures result in the production of liquid slag which interacts with the refractories in a manner destructive to the refractories. As a result, the hot face of the innermost refractory is gradually eroded away during the operation of the gasification process, and as the refractory is worn away thermocouples used to measure the temperature of the process are exposed and are themselves destroyed by erosion. Consequently it has become usual to protect the thermocouples with a casing of refractory material, and also it has become advantageous to use a plurality of thermocouples in a bundle, each one being recessed farther than another within the hot face of the innermost refractory. Then as one thermocouple is destroyed by the high temperature slag, another one backing it up takes its place. If the back-up thermocouple is destroyed in turn, another one behind it comes into play. The result of these steps to protect the temperature measuring devices is that the thermocouple bundle plus its refractory casing becomes quite heavy, and since, in addition, the thermocouples need to be long enough to extend through the thick refractory courses the weight of the bundle and casing is concentrated at a substantial distance away from the point of support, with the result that it is difficult to provide adequate thermocouple support.

At the same time another problem arises as the high temperature innermost refractory course of the reaction chamber lining expands upwardly more than the lower temperature shell of the reactor vessel. The result is that the innermost refractory course tends to come in contact with the thermocouple casing, which is attached to the reactor vessel shell. In extreme cases such contact can have a destructive effect on the thermocouple bundle and casing.

This invention provides a novel means of supporting the long heavy thermocouple bundle and casing and at the same time provides for expansion of the inner hot face refractory material without its coming in contact with the thermocouple casing. An advantageous aspect of the present invention design is that construction is simplified and use is made of readily available components for which no special machining is required. Installation and servicing are simplified as the design uses standard techniques and components. Also a simple design is provided for the transition from the individual elements of the thermocouple bundle to a standard wire sealing transducer gland. Whereas conventional means of supporting an elongated thermocouple bundle, such as is used to extend through the thick refractory walls of a combustion chamber, involves a cantilever design in which the weight of the heavy thermocouple bundle is supported by a long lever arm exerting a substantial torque at the point of attachment to the reactor vessel shell, this invention provides an improved means of supporting the weight directly at a point near its center of gravity without use of a cantilever design and in a manner that makes use of readily available standard components. At the same time the improved means of this invention avoids the problem of damaging contact between the expanding refractory and the thermocouple casing.

SUMMARY OF THE INVENTION

The present invention provides a thermocouple assembly design in which the thermocouple bundle and castable casing are supported at an intermediate point along the length of the casing, the support being provided by a surrounding rigid sleeve which is itself attached to the reactor vessel shell.

The problem of refractory expansion with resulting damaging contact with the thermocouple casing is overcome by so arranging the spacing between the thermocouple assembly and the several courses of refractory material lining the chamber that differential expansion is allowed for. Additionally a sheath, which optionally surrounds the thermocouple assembly and provides thermal and mechanical protection for it, is also so arranged with respect to the assembly that differential expansion is allowed for.

The advantage of using a plurality of thermocouples, such as for example three thermocouples recessed at staggered distances within the hot face of the refractory, is not only that backup thermocouples are provided to take the place of thermocouples damaged during operation but also that the operators of the process are able to monitor refractory wear during gasifier operation. For example, as the inmost thermocouple junction is exposed by erosion of the refractory material the backup thermocouple junction just behind it will indicate that this is occurring by a rise in the temperature which it reads. The advantage of embedding the thermocouple bundle in castable refractory rather than in a hollow sheath is that erosion back to the tip of the outermost thermocouple element does not expose the other elements.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DETAILED DESCRIPTION

Figure 1A:
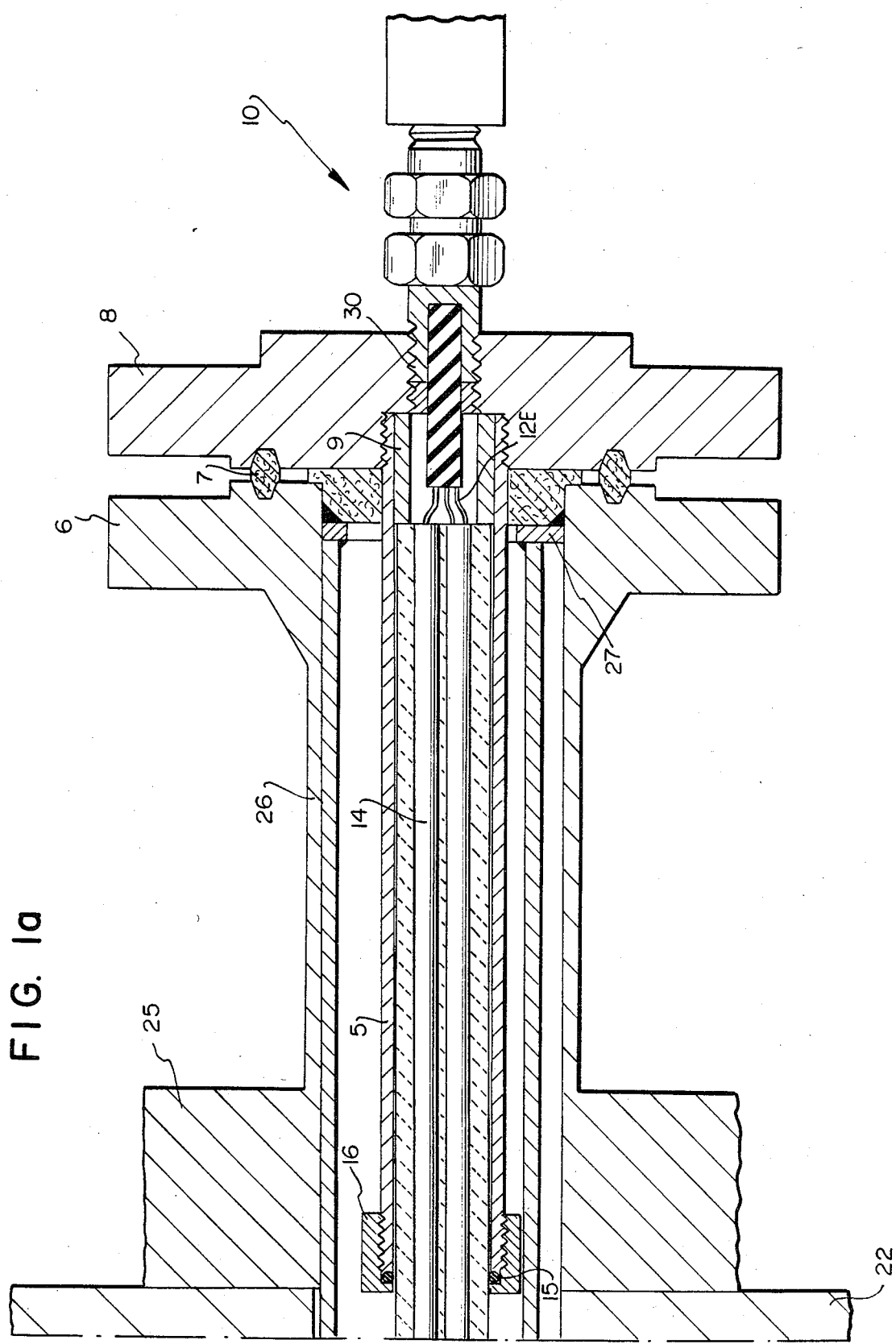
FIGS. 1a and 1b are elevation views of the thermocouple assembly and optional protective sheath in place within the shell of a reactor vessel, showing the assembly extending through successive courses of refractory which line the interior of the shell.
Figure 1B:
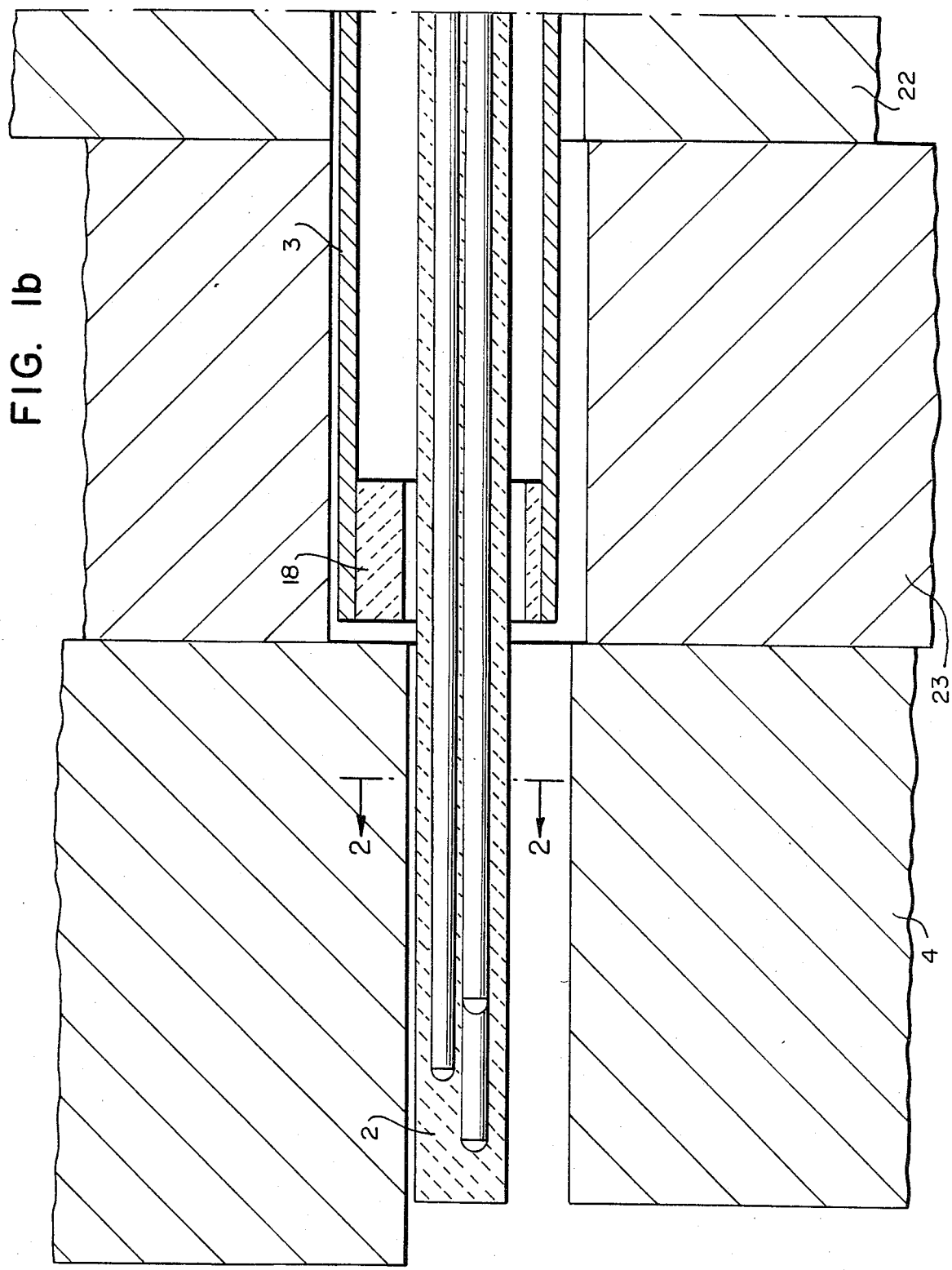

Referring now to the drawings, FIGS. 1a and 1b show a thermocouple assembly comprising a castable casing or matrix 2 enclosing thermocouple leads, insulators, and protective tubes as set forth more fully below and also a support sleeve 5, said matrix and sleeve positioned within and extending through a thermowell 26 upon the side of a reactor vessel shell 25, said shell being lined internally with outer course fire brick refractory 22 adjacent shell 25, intermediate course insulating refractory 23 next within refractory 22, and inner course hot face refractory 4 next within refractory 23.

There are one or more pairs of thermocouple leads 12 (FIGS. 2 and 3) within matrix 2, each having a junction end 12J and an exit end 12E. Each pair is encased in a 2-hole bore alumina insulator 13 which is inserted into an alumina protective tube 14. Insulators 13 and protective tubes 14 cover the thermocouple leads from their junction end 12J to their exit end 12E. At the point of exit from protective tube 14 each pair of thermocouple leads is sealed within its protective tube 14 against both electrical leakage and leakage of the hot fluid of the reaction vessel by means of Teflon spacer 20 and high temperature cement 21.

The protective tubes 14 are embedded in an elongated refractory matrix 2. It is prepared preferably from a castable refractory similar in composition to the hot face refractory 4. This similarity in composition is advisable in order to protect the castable refractory from slag attack. When two refractories of different composition are used in close proximity in the high temperature region of a reaction vessel there is a tendency for the composition of both refractories to become that of a lower melting eutectic, which results in destruction of the exposed portions of the refractories. Refractory 4 may, for example, have a composition of about 80 percent chromium oxide and about 20 percent magnesium oxide, in which case it is advisable to use for matrix 2 a castable refractory of the same composition. The advantage of using a refractory that is castable is that it can be formed as a matrix surrounding alumina protective tubes 14 and isolating each tube 14 from the others, so that exposure of any one thermocouple element by erosion does not result in exposure of the others.

Figure 2:
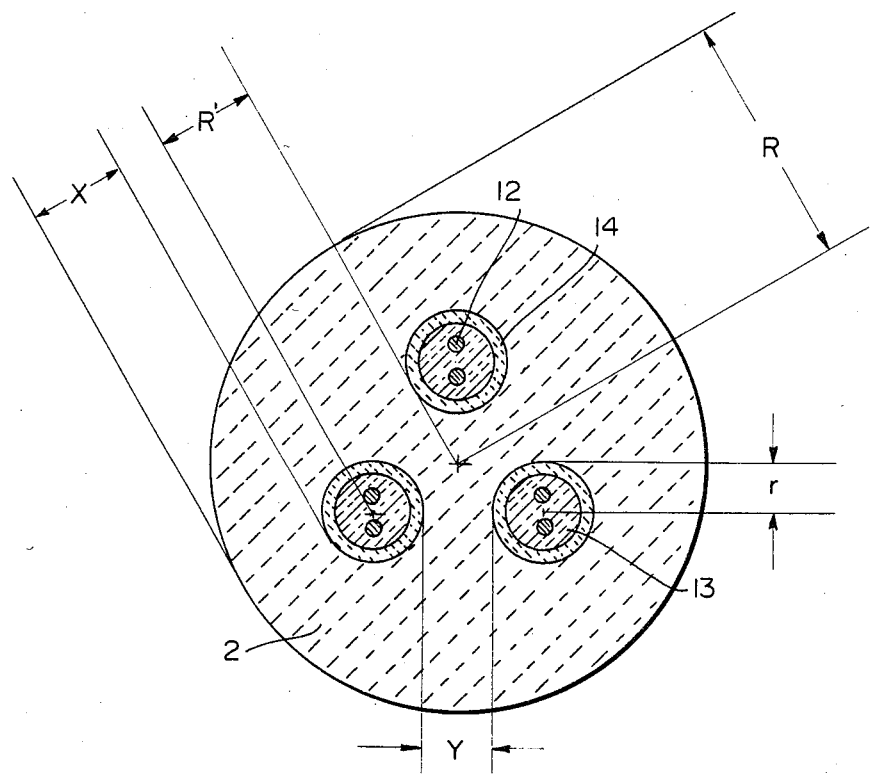
FIG. 2 is a cross-sectional view along the line 2—2 of FIG. 1b, the thermocouple bundle embedded within its castable refractory casing.
Figure 3:
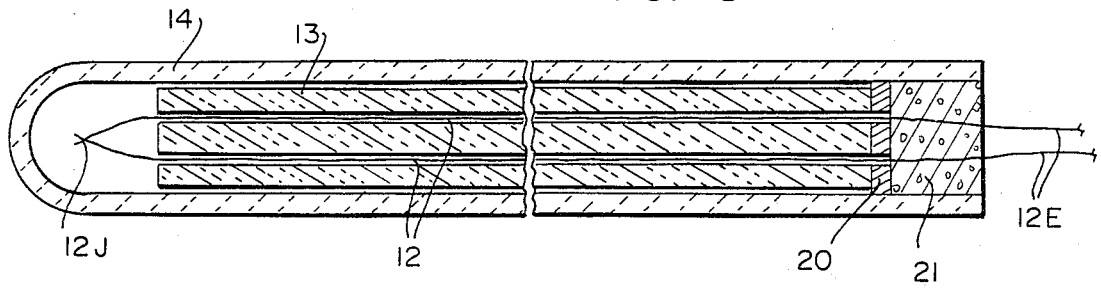
FIG. 3 is a longitudinal cross-section of one insulated thermocouple encased in its protective tube.

Experience in partial oxidation gasifiers indicates that thermocouple life is proportional to the third power of the dimension x in FIG. 2, and therefore one wishes to make x as large as possible. However x must not be so large that protective tubes 14 come in contact with each other, since erosion back along tubes 14 is faster than erosion of matrix 2. Taking these constraints into consideration one finds the optimal ratio of the dimensions represented in FIG. 2 for a matrix containing three thermocouples expressed as percentages of the radius R of matrix 2 as follows:

$R' = 38.8\%$ of R
$r = 23.3\%$ of R
$x = 37.9\%$ of R
$y = 20.6\%$ of R, where $R'$ is the radial from the center of matrix 2 to the center of each tube 14, r is the radius of each tube 14, x is the minimum thickness of castable refractory between each tube 14 and the atmosphere of the combustion chamber, and y is the minimum thickness of castable refractory separating tubes 14 from each other. For example, if $R = 0.805$ inches, then $R' = 0.3125$ inches
$r = 0.1875$ inches
$x = 0.305$ inches
$y = 0.166$ inches.

A support sleeve 5 fits loosely over the matrix 2 and carries on its end packing nut 16 containing packing 15. Matrix 2 is supported within sleeve 5 when packing nut 16 is drawn up tight on the end of support sleeve 5 so that packing 15 is compressed inwardly, providing the required support at an intermediate point along the length of matrix 2. Packing 15 is a high temperature gasket material.

The thermocouple assembly, comprising matrix 2 and its contents as described above and also support sleeve 5, is mounted within thermowell 26, which extends from the side of shell 25 of the reactor vessel and which contains a thermowell aperture flange 6. Flange 6 mates with a closure flange 8, which is a blind flange drilled and tapped to receive a wire sealing transducer gland 10 such as a CONAX TG gland supplied by Instrument Laboratories, Gardena, Calif. Wire sealing transducer gland 10 comprises a small diameter core-like insulating member 30 and a larger diameter housing containing sealing material and hardware for assembling the completed transducer gland. Since transducer gland 10 is a conventional and commercially available article and does not constitute a part of this invention per se, no more detailed description thereof is given here. The thermocouple leads 12E exiting from matrix 2 pass through the insulating core member 30 of wire sealing transducer gland 10 to the exterior of the reaction vessel. Flange 8 is partially bored and threaded to mate with support sleeve 5.

To assemble the device, each thermocouple pair 12 within insulators 13 is inserted in its protective tube 14 which is encased in the castable refractory matrix 2, and the exiting thermocouple leads 12E are sealed using Teflon spacer 20 and high temperature cement 21. The thermocouple leads 12E exiting from the matrix are threaded through the core-like insulating member 30 of wire sealing transducer gland 10, and matrix 2 is then slipped into and through sleeve 5, extending beyond the end of support sleeve 5 upon which the packing nut 16 containing packing 15 is loosely mounted. Spacer 9 which advantageously may be a split ring spacer to facilitate assembly, is then inserted in the end of support sleeve 5 at which the thermocouple leads 12E exit from castable refractory matrix 2. This spacer provides room for thermocouple leads 12E to be gathered into the core-like insulating member 30 of wire sealing transducer gland 10. Support sleeve 5 is then attached by a threaded joint to closure flange 8. Packing nut 16 is then tightened, compressing the packing 15 inwardly upon matrix 2, thus supplying support for the matrix at this intermediate position along its total length. The housing of wire sealing transducer gland 10 is then screwed into place on closure flange 8 from the outside of flange 8, i.e. exterior to the vessel, and made up in a conventional manner to seal and insulate around the thermocouple leads threaded therethrough. Closure flange 8, now rigidly assembled with support sleeve 5 and refractory matrix 2 suspended within support sleeve 5 as set forth above, is then drawn up against aperture flange 6 while at the same time inserting matrix 2 and sleeve 5 through the aperture thereof, and the flange joint is made up. High temperature gasket material 7 is used for sealing the made up flange joint.

The thus assembled thermocouple device extends as shown in FIGS. 1a and 1b from the joint of flanges 6 and 8 all the way through thermowell 26, reactor vessel shell 25, outer course fire brick refractory 22, intermediate course insulating refractory 23, and partially through inner course hot face refractory 4.

There is optionally provided, as both mechanical and thermal protection for the thermocouple assembly, a sheath 3 which is mounted within thermowell 26 by means of mounting plate 27 as described further below. Sheath 3 extends from mounting plate 27 all the way through thermowell 26, vessel shell 25, outer course 22 and inner course 23 refractories, terminating just short of hot face refractory 4. Within the end of sheath 3 just short of hot face refractory 4 there is a castable refractory annular plug 18 with inside diameter slightly larger than the outside diameter of matrix 2. The purpose of refractory annular plug 18 is to block heat transmission from the reactor vessel into lower temperature portions of the thermocouple assembly. Sheath 3 is mounted within thermowell 26 in upwardly displaced off center alignment with respect to matrix 2 and aperture flange 6 by means of a welded joint to eccentric mounting plate 27, which has in turn been welded in position within the aperture of aperture flange 6 as indicated in FIG. 1. This eccentric high-side mounting for sheath 3 allows for the upward expansion of intermediate course insulating refractory 23 without the refractory reaching sheath 3. It will be seen also that the opening in hot face refractory 4 for passage therethrough of matrix 2 is eccentric with respect to matrix 2, being in downwardly displaced off center alignment therewith so that refractory 4 upon expanding does not reach the material of matrix 2.

A preferred embodiment of the invention has been described above. However it will be clear to one skilled in the art that modifications can be made without departing from the spirit and scope of the invention. All such modifications are intended to be included within the scope of the invention, which is to be limited only by the following claims.

We claim:

1. A thermocouple assembly for introducing thermocouple junctions, each having a pair of thermocouple leads, horizontally through a thermowell in the shell of a reactor vessel, said vessel containing a high temperature fluid whose temperature is to be measured, said thermocouple leads extending through a plurality of refractory courses lining said shell, said courses including an innermost hot face course exposed to said high temperature fluid and said thermowell having an aperture flange and a mating closure flange containing means for sealing and insulating said thermocouple leads and passing said leads through said closure flange, comprising a plurality of pairs of thermocouple leads, each pair having a thermocouple junction at a junction end thereof and a thermocouple exit end opposed to said junction end, said pairs being bundled together with their junction ends longitudinally displaced from each other, a matrix of refractory material surrounding and supporting said thermocouple leads over the entire length thereof from said exit ends to said junction ends, said matrix having an exit end surrounding said thermocouple leads exit ends and a junction end surrounding said thermocouple leads junction ends, a sheath surrounding and protecting said matrix from the exit end thereof to a section of said matrix adjacent said hot face course, said sheath having an exit end surrounding said matrix exit end and a hot face end surrounding said matrix section adjacent said hot face course, and a support sleeve internal to said sheath and surrounding said matrix from said matrix exit end to a section of said matrix intermediate said matrix exit and junction ends, said support sleeve loosely fitting over said matrix and having an exit end where it surrounds said matrix exit end and an opposed end where it surrounds said matrix intermediate section.

said support sleeve having at said opposed end a male threaded portion with a packing nut and contained packing thereon for gripping said matrix when said nut is drawn up on said male threaded portion, said matrix being supported at said intermediate section thereof by said packing when said packing nut is drawn up on said male threaded portion of said support sleeve, said sheath being attached at its exit end to said thermowell aperture flange in upwardly displaced off-center alignment with respect to said matrix so that said sheath is not contacted by a hot refractory course as it thermally expands upwardly during operations within said reactor vessel, said sheath further having an annular plug of refractory material within its hot face end, said annular plug having an inside diameter slightly larger than the outside diameter of said matrix, said plug acting to block the transmission of heat from said high temperature fluid to lower temperature portions of said thermocouple assembly.

2. A thermocouple assembly as in claim 1 wherein said matrix and annular plug refractory material is a castable refractory material having a composition of about 80% chromium oxide and about 20% magnesium oxide.

3. An elongated thermometer assembly (10) adapted to be horizontally positioned within a reactor vessel shell (25) which contains a hot fluid, whereby to sense the temperature of the latter, which thermometer assembly includes:

at least one pair of thermocouple leads (12) which are joined at one end to define a common junction (12J), a refractory matrix (13) embedding the at least one pair of thermocouple leads (12) for substantially the length thereof, a closure tube (14) surrounding said matrix (13) and defining a void about said common junction (12J), an elongated second matrix (2) encompassing said closure tube (14), a rigid sleeve means (5) disposed coaxially of said second matrix (2) in supporting relation thereto, at least one support means (16) depending outwardly from said sleeve means (5), being contiguous with said vessel shell (25) whereby to engage the latter when the thermometer assembly adjusts downwardly in response to a temperature condition within the reactor shell.

4. In the apparatus as defined in claim 3, wherein said at least one support means (16) operably engages said sleeve (5) to be longitudinally movable therealong.

5. In the apparatus as defined in claim 3, wherein said sleeve means (5) extends partially along said second matrix (2), and said at least one support means (16) is threadably engaged thereto.

6. In the apparatus as defined in claim 5, wherein said sleeve means (5) extends approximately one-half of the length of said matrix (2).

7. In the apparatus as defined in claim 5, wherein said sleeve means (5) is threaded at one end, and said at least one support means (16) includes a ring member which threadably engages said one threaded end of said sleeve means.

8. In the apparatus as defined in claim 7, wherein said ring member (16) includes a resilient packing (15) which deforms in response to ring member (5) being threadably adjusted on said sleeve member (5) whereby said packing (15) in deformed position will engage the sleeve member (5) and said second matrix (2) respectively.

* * * * *